Sept. 29, 1959 A. H. JONES 2,906,371
DUST BAG FOR DUST FILTER
Filed Oct. 28, 1957 2 Sheets-Sheet 2

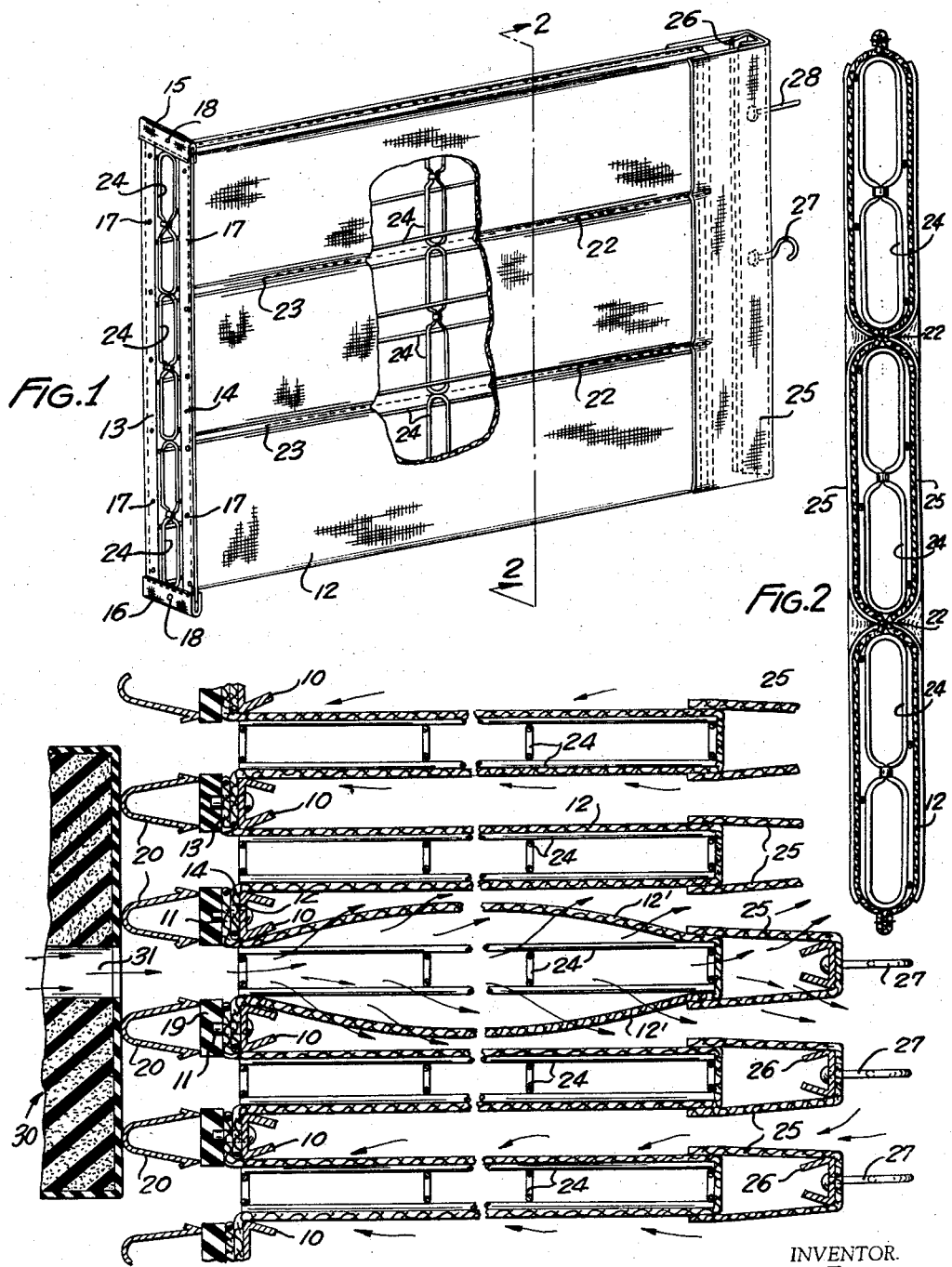

INVENTOR.
ALLEN H. JONES
BY Hudson, Boughton,
Williams, David & Hoffman
ATTORNEYS

2,906,371
DUST BAG FOR DUST FILTER

Allen H. Jones, Chagrin Falls, Ohio, assignor to The W. W. Sly Manufacturing Company, Cleveland, Ohio, a corporation of Ohio Application October 28, 1957, Serial No. 692,778

2 Claims. (Cl. 183—61)

This invention relates to improvements in dust bags for dust filters.

It has to do primarily with a sectionalized dust bag. These bags are used in a series arranged side by side in the dust compartment of the filter substantially in the manner shown in Patent 2,695,681 to George A. Boesger, the open ends of the bags being attached to the dust wall, so that dust laden air entering the filter from the rear under the effect of suction applied to the clean air chamber is drawn through the bags from the outside to the inside thereof, separating the dust from the air which, in its then clean condition, passes into the clean air chamber and thence out of the casing through the air blower.

In order that dust collected on the outer sides of the bags shall not build up to such an extent as to block flow and materially interfere with the filtering operation, a traveler is mounted in the clean air chamber and driven back and forth over the dust wall, through which traveler reverse air flows into one bag at a time and out through the walls thereof, dislodging the dust that is collected on the outer surface of the bag.

Inner wire spacers are commonly mounted in the bags to prevent them from collapsing due to suction during the regular filtering operation. Heretofore in the present type of dust filters having reverse air means for cleaning one bag at a time, outer spacers or wire frames have been mounted between successive bags in order to allow the dislodged dust to drop free of the bags rather than be pressed between the sides of the bags as they balloon outwardly during the reverse air cleaning. The bag being cleaned balloons against the outside spacer moving that spacer into rubbing contact with an adjacent bag, and wear is experienced at the points where the cross wires of the inner spacer of the adjacent bag contact and rub against the cloth held distended by the wires of the outer spacer. The present invention overcomes this wear difficulty.

In accordance with this invention, each bag is sectionalized into two or more horizontal sections, three sections being shown herein as the preferred form. In operation, all of the bags except the one being cleaned, allow air to pass through any point on either wall of a section when it is free to flow along the interior of the section and out at its open front end. During the cleaning of a bag, the air passage is reversed and air flows into the open front end and out through any point on either wall, dislodging the dust. At the same time, the sections of the bag will balloon outward only slightly, when compared to the ballooning of an unsectionalized bag, and the dust will fall free rather than be compacted against the adjacent bag. As a section of a bag balloons outwardly, it forms an arc and touches the adjacent bag only along a narrow horizontal area in the center of this arc. The remainder of the section is not in contact with the adjacent bag and a horizontal cavity or valley is formed into which the dust will drop and through which the reverse air is free to pass into the main dust stream. As the traveler transfers the cleaning air to the next bag, it continues to block off from suction, the bag just cleaned and the walls of the section change from ballooning outwardly to a vertical position, allowing the accumulated dust in the cavities to fall down into a hopper or suitable means located below the bags. The speed of the traveler is such that in its movement, it continues to block off the bag just cleaned long enough for the dust to fall away from the bag area where it will not be picked up and redeposited when the bag is once again under suction. By this means I accomplish a very important result; namely, the elimination of the outer wire spacers and the bag wear attendant thereupon. The outer spacers not only add materially to the cost of the unit, but due to the occasional breakage of wires constituting the spacers, the wires of the latter frequently puncture the bags, permitting unfiltered air to enter into the clean air chamber, necessitating repair and down time for the whole filter.

Accordingly, an object of the invention is the provision of horizontally sectionalized bags, which balloon outwardly to a limited extent only during the cleaning operation in the manner described above, so that no spacers between the bags are required.

Another object is the provision of cloth strips that are U-shaped in cross section and are attached to the rear edges of the bags, adapted to receive rigid rear mullions through which a pull may be exerted on each bag to maintain it under tension. In some cases, however, vertical cloth compartments to receive the mullions may be provided at the rear end of the bags by means other than the separate cloth strips illustrated herein.

Another object is the elimination of holes in the back of the bag itself by the addition of the U-shaped flap through which the rigid rear mullion is attached to springs and other structural members to position the bag and also to maintain it under the proper tension. In accordance with the present practice, the tension of the bag must be maintained at a constant and precise amount, necessitating retensioning of the fastenings at frequent intervals, otherwise the rear mullions and the bags tended to sag to the extent that the holes in the backs of the bags for receiving the fastenings would elongate and no longer remain sealed tight against the back mullions. In accordance with the present invention, where the fastenings do not enter the bag proper, but merely the U-shaped flap, failure to tension the fastenings at frequent intervals does not result in holes in the bag and the consequent leakage of dust.

Still another object of this invention is the protection of the rear of the bag against erosion from the abrasive qualities of the dust laden air stream.

Another object of this invention is the reduction of wear on the bottom of the bag formerly caused by the entire weight of the inner spacer resting on the bottom seam. The present invention distributes the weight throughout the bag by means of smaller spacers in each compartment, and correspondingly cuts down the wear on the cloth.

Another object of this invention is the lessening of the effect of a hole worn in the bag from normal operation over a period of time. The sectionalized filter bag will accumulate less dust in any section in direct proportion to the number of sections when compared to the single compartment bag. The large accumulation of dust in a single compartment bag can cause the bag to tear away from its fastenings allowing a major dust leak to develop through the dust wall. As a single compartment bag fills with dust from a leak it will also swell out to very large proportions and will press against adjacent bags to the extent that they are pushed together and rendered inoperative.

Fig. 1 is a perspective view of a sectionalized bag embodying the invention, with parts broken away to show separate spacers mounted within the different sections of the bag.

Fig. 2 is a vertical sectional view on a larger scale, the section being taken substantially on the line 2—2 of Fig. 1.

Fig. 3 is a fragmental horizontal section of a series of bags and a portion of a traveler wiping over a dust wall to which the open ends of the bags are connected, and embodying means for causing reverse air to flow from the inside to the outside of one bag at a time for cleaning the bags.

Figure 4:
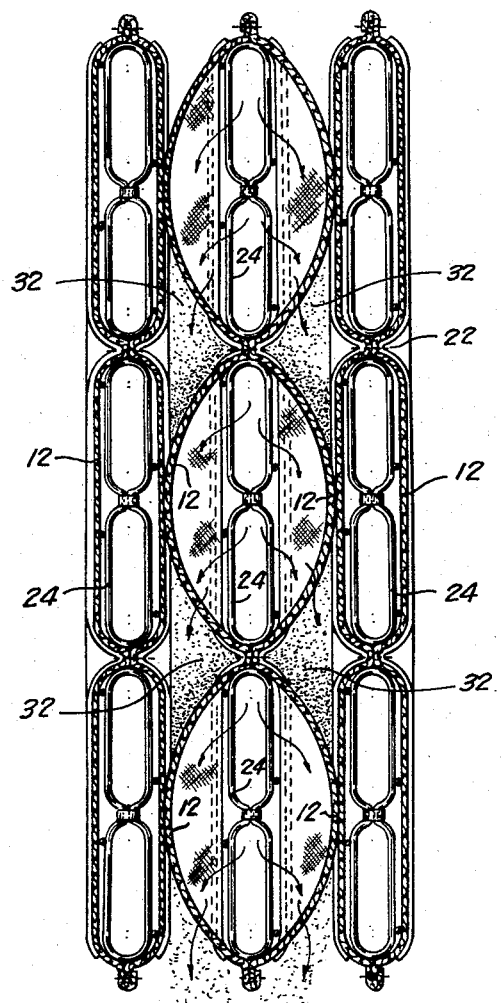
Fig. 4 is a vertical sectional view of three bags, the center one of which is being cleaned and showing diagrammatically the hopper or other container into which the removed dust falls.

In Fig. 3 of the drawings there is illustrated in horizontal section a fragment of a dust filter comprising a dust wall in which there are rigid metal mullions 10. Each mullion carries a series of vertically spaced pins 11. Each fabric bag 12 has a pair of laterally extending flaps 13 and 14 at its forward end and upper and lower flaps 15 and 16. These flaps are provided with perforations 17 and 18 to receive the pins 11.

The flap 13 of a given bag is mounted over a mullion 10 with its perforations 17 receiving the pins 11 of that mullion while its flap 14 is mounted over an adjacent mullion and the pins 11 thereof. The flaps 13 and 14 of each bag over or underlap the flaps of adjacent bags. Hence, each mullion has attached thereto a flap of each of two adjacent bags.

A rubber strip 19 covers each vertical series of pins 11, and false mullions 20 of metal presenting rounded forward faces are mounted in contact with these rubber strips.

Each bag 12 is provided with at least one, and preferably two horizontal seams 22 which extend from the rear edge of the bag to a point 23 behind its forward end. This termination of the seams behind the forward end of the bag leaves the flaps 13 and 14 continuous as they must be for good connection with the front mullions. These horizontal seams accomplish the sectionalizing of the bags.

Within each of the sections of each bag there is mounted an internal wire spacer 24, the function of which is to prevent the collapsing of the bag, or the different sections of the bag, during the ordinary dust filtering operation. If it were not for these spacers the two side walls of the bag would come together under the influence of the suction exerted through the open end of the bag and that would prevent any substantial dust filtering action. In practice the spacer in each section may be made in two parts meeting at the middle, which parts may be inserted into the bag one after the other, which is merely a matter of convenience in inserting the spacers from the narrow confines of the clean air chamber.

At the rear end of each bag, extending substantially throughout its full height, there is a fabric strip 25 which is U-shaped in cross-section and the edges of which are sewed to the side walls of the bag proper. Mounted in each strip there is a rear mullion 26 which also extends from top to bottom of the bag. Near the middle of each mullion there is a rearwardly extending hook 27 which projects through a small hole in the strip 25 provided for that purpose. In the mullion spaced from hook 27 there is also a pin 28 extending rearwardly through a hole in the strip 25. To the hook 27 there is fastened means for exerting a rearward pull on the mullion 26. This means may or may not include a tension spring, not herein shown. The hook 27 and the pin 28 together assist the strip 25 in maintaining the vertical position of the mullion and bag. The strip 25 in addition to its other functions constitutes a mask which protects the rear edge of the bag from abrasion by the dust laden air stream. This abrasive action can wear certain of the strips 25 to the extent that holes are formed in them. Holes in these strips are unimportant, but if the strips were absent as in former bags the holes would be formed eventually in the rear edges of the bags which obviously would end their usefulness.

A traveler 30 is caused to move back and forth across the dust wall over the smooth false mullions 20. The traveler includes a passage 31 through which reverse air is caused to flow into one bag at a time and through the bag from inside to outside, by means of which any dust caked on the outer surface of the bag is blown off and drops into a hopper positioned underneath the series of screens or bags. The traveler also blocks off from normal flow of air one or more bags on either side of the one being cleaned. This allows for the dust removed from the bag being cleaned to drop down between the bags into a receiver without being picked up and redeposited by the normal air flow.

In Fig. 3 one section of the bag being cleaned by reverse air is marked 12'. The ballooning of the bag is shown in approximately the correct proportions. The fact that the bag is tensioned lengthwise and that its side walls are held together by the seams 22 function together to prevent sufficient ballooning to stop dust removal by the action of the reverse air.

Fig. 4 illustrates how the seams 22 also prevent ballooning when viewed in the vertical section shown. Also shown are cavities 32 between the bag being cleaned and the bags on either side that are blocked off from normal air travel thru the bag. These cavities allow for passage of the reverse air and removal thereby of some of the dust. The remainder of the dust builds up in the cavities and is released to the hopper below when the traveler moves to the next bag and the cloth snaps back into a vertical or normal position. The dust is allowed to fall between the bags rather than be redeposited on the bags by the temporary blocking off of the bags by the traveler of the normal flow of air.

Having thus described my invention, I claim:

1. In a dust collector comprising a dust wall and a bag extending transversely of the wall and having an open end connected to the dust wall in registry with an individual opening therein, said dust wall separating high and low pressure compartments with said bag being disposed in the high pressure compartment whereby air to be cleaned flows through said bag from the exterior to the interior thereof and then through said opening, the improvement which comprises means connecting the opposite sides of said bag to divide said bag into a plurality of compartments which extend transversely of said wall and open into said opening, and an individual rigid spacer disposed in and wholly supported within each of said compartments and preventing said bag from collapsing.

2. In a dust collector, the structure as defined in claim 1 wherein said fastening means comprises stitching which provides a seam that connects the opposite sides of the bag.

References Cited in the file of this patent

UNITED STATES PATENTS

| | | |
|---|---|---|
| 2,010,898 | Ruemlin | Aug. 13, 1935 |
| 2,507,335 | Donohue | May 9, 1950 |
| 2,583,039 | Boesger | Jan. 22, 1952 |
| 2,667,233 | Vedder | Jan. 26, 1954 |
| 2,695,681 | Boesger | Nov. 30, 1954 |